US011962336B2

United States Patent
Liao

(10) Patent No.: US 11,962,336 B2
(45) Date of Patent: Apr. 16, 2024

(54) WIDE BAND ACTIVE ANTENNA SYSTEM RADIO

(71) Applicant: Telefonaktiebolaget LM Ericsson (publ), Stockholm (SE)

(72) Inventor: Jichang Liao, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/790,329

(22) PCT Filed: Feb. 6, 2020

(86) PCT No.: PCT/SE2020/050112
§ 371 (c)(1),
(2) Date: Jun. 30, 2022

(87) PCT Pub. No.: WO2021/158151
PCT Pub. Date: Aug. 12, 2021

(65) Prior Publication Data
US 2023/0085081 A1  Mar. 16, 2023

(51) Int. Cl.
*H04B 1/00* (2006.01)
*H04B 1/50* (2006.01)
(Continued)

(52) U.S. Cl.
CPC .............. *H04B 1/0057* (2013.01); *H04B 1/50* (2013.01); *H04B 7/0691* (2013.01); *H04B 7/0874* (2013.01); *H04B 7/10* (2013.01)

(58) Field of Classification Search
CPC ...... H04B 1/0057; H04B 1/50; H04B 7/0691; H04B 7/0874; H04B 7/10
See application file for complete search history.

(56) References Cited

U.S. PATENT DOCUMENTS

| 4,689,627 A | 8/1987 | Lee et al. |
| 7,808,427 B1 | 10/2010 | Sarcione et al. |

(Continued)

FOREIGN PATENT DOCUMENTS

| CA | 2997256 C | * 3/2023 | ........... H04B 1/1027 |
| EP | 3079415 A1 | 10/2016 | |
| WO | 2007026819 A1 | 3/2007 | |

OTHER PUBLICATIONS

3GPP TS 38.104 V15.7.0, "3rd Generation Partnership Project; Technical Specification Group Radio Access Network; NR; Base Station (BS) radio transmission and reception (Release 15)," Sep. 2019, 226 pages.

(Continued)

*Primary Examiner* — Jean B Corrielus
(74) *Attorney, Agent, or Firm* — Sage Patent Group

(57) ABSTRACT

A radio chain arrangement comprising at least two levels of radio chain entities. Each of the levels of radio chain entities is associated with a respective frequency range encompassing at least one radio frequency band each. At least two radio chain entities of a lower level of radio chains are comprised in a radio chain entity of a next higher level. Each radio chain entity of the at least two levels of radio chain entities comprises a respective radio transceiver arrangement that is connected to at least a respective one of a number of antenna multiplexers. For all radio chain entities except a lowest level, the respective radio transceiver arrangement is connected to the antenna multiplexers via a splitter arrangement. An active antenna system comprising such radio chain arrangements and a method for its operation is also disclosed.

20 Claims, 10 Drawing Sheets

(51) Int. Cl.
  *H04B 7/06*  (2006.01)
  *H04B 7/08*  (2006.01)
  *H04B 7/10*  (2017.01)

(56) References Cited

U.S. PATENT DOCUMENTS

| | | |
|---|---|---|
| 2017/0331531 A1 | 11/2017 | Wu |
| 2018/0076834 A1* | 3/2018 | Wloczysiak ......... H04M 11/062 |
| 2019/0273309 A1 | 9/2019 | Bisiules |
| 2019/0356344 A1* | 11/2019 | Takada ................. H04B 1/0064 |
| 2020/0162114 A1* | 5/2020 | King .................... H04B 1/0057 |
| 2020/0287583 A1* | 9/2020 | Farahvash ................ H04B 1/40 |

OTHER PUBLICATIONS

Emil Björnson, Erik G. Larsson and Thomas L. Marzetta, "Massive MIMO: Ten Myths and One Critical Question," IEEE Communication Magazine, Feb. 2016, pp. 114-123.

Stefan Parkvall, Erik Dahlman, Anders Furuskär and Mattias Frenne, "NR: The New 5G Radio Access Technology," Wireless and Radio Communication, IEEE Communication Standard Magazine, Dec. 2017, pp. 24-30.

International Search Report and Written Opinion of the International Searching Authority for PCT International Application No. PCT/SE2020/050112 dated Nov. 6, 2020.

Office Action dated Aug. 28, 2023 for European Patent Application No. 20707858.5, 7 pages.

\* cited by examiner

| MULTI-BAND COMBINATION | OPERATING BAND | UL BAND | | DL BAND | |
|---|---|---|---|---|---|
| | | START (MHz) | STOP (MHz) | START (MHz) | STOP (MHz) |
| B7/B3/B74/B28/B71 | B7 | 2500 | 2570 | 2620 | 2690 |
| | B3 | 1710 | 1785 | 1805 | 1880 |
| | B74 | 1427 | 1470 | 1475 | 1518 |
| | B28 | 703 | 748 | 758 | 803 |
| | B71 | 663 | 698 | 617 | 652 |

WIDE BAND ACTIVE ANTENNA SYSTEM RADIO

CROSS REFERENCE TO RELATED APPLICATION

This application is a 35 U.S.C. § 371 national stage application of PCT International Application No. PCT/SE2020/050112 filed on Feb. 6, 2020, the disclosure and content of which is incorporated by reference herein in its entirety.

TECHNICAL FIELD

The proposed technology generally relates in general to wide band active antenna system radio, and in particular to a radio chain arrangement, an active antenna system comprising a radio chain arrangement, and a method for operating an active antenna system.

BACKGROUND

3GPP has completed the freeze of 5G Non-Standalone (NSA) specification in March 2018 and 5G Standalone (SA) specification in September 2018. Now, the whole telecommunication industry steps forward at full speed towards 5G commercialization. Numerous new features are introduced in the 5G NR system, in which, the massive Multiple-Input Multiple-Output (MIMO) is the prominent one due to its capability of improvement on spectral efficiency and energy efficiency. Active Antenna System (AAS) is an implementation of the massive MIMO, which integrates the RF transceiver and the antenna array to achieve a compact size and a low power consumption. AAS utilizes beamforming to enlarge the coverage, or Multiple User Multiple-Input Multiple-Output (MU-MIMO) or Single User Multiple-Input Multiple-Output (SU-MIMO) to boost the throughput.

Even though, the mobile broadband operators must rely on several different frequency bands, often non-contiguous, in order to provide capacity and coverage to the end-users. Today the operators already face challenges with more and more radio mounted at the sites, especially in urban areas. Current mobile broadband applications aim mainly at frequencies from 600 MHz and 39 GHz. More and more features and communication needs are believed to be presented, so more and more products are needed if a single band solution is to be continued. The operator will meet big site problems.

The wide band AAS radio is good approach to solve at least some of the site problems. Wide band AAS radio can improve the capacity a lot and at the same time different bands can share parts of common hardware, such as e.g. the wideband antenna and the wideband Power Amplifier (PA) in the same radio. The wide band radio typically means the very widely spread frequencies have to be covered. It is not unusual that frequency ratios of more than 5:1, such as e.g. from 600 MHz to 3000 MHz, have to be covered.

A standard wideband radio may typically be composed of a wideband antenna, a wideband PA, a wideband Transceiver (TRX), a filter box and a digital radio part. The filter box is typically band specific, which means that there has to be one set of filters for each frequency band and for each antenna array element. As an example, aiming for five frequency bands and having a 64-element antenna array will together sum up to 320 sets of filters.

Furthermore, the PA has to be compatible with all frequency bands, which require relatively sophisticated solutions. At least a part of the digital radio may be made wideband compatible, by using e.g. a Digital PreDistortion (DPD). Otherwise, also here, separate solutions for different frequency bands may be necessary.

Wideband dipole elements are usually used to construct wide band antenna arrays. When considering the wireless communication case, the dipole element size is mainly decided by the highest used frequency, while the whole antenna array size mainly depends on the lowest used frequency in order to reach reasonable antenna gain.

Such solution approaches have obviously some remaining problems. The radio unit becomes very large and heavy, having hundreds of duplexers. The digital radio is complex, needing hundreds of digital radio process chains. The PA needs to cover all the frequencies, which makes it difficult to reach high efficiency. To construct a DPD covering a wideband PA is also a big challenge.

SUMMARY

It is an object to provide radio chain arrangements, active antenna systems and methods for operating an active antenna system that enables use of smaller and less costly radio equipment.

This and other objects are met by embodiments of the proposed technology.

According to a first aspect, there is provided a radio chain arrangement comprising at least two levels of radio chain entities. Each of the levels of radio chain entities is associated with a respective frequency range encompassing at least one radio frequency band each. At least two radio chain entities of a lower level of radio chains are comprised in a radio chain entity of a next higher level of radio chain entities. Each radio chain of the at least two levels of radio chain entities comprises a respective radio transceiver arrangement that is connected to at least a respective one of a number of antenna multiplexers. For all radio chain entities except a lowest level of radio chains, the respective radio transceiver arrangement is connected to the respective one of the number of antenna multiplexers via a splitter arrangement.

According to a second aspect, there is provided an active antenna system comprising a radio chain arrangement according to the first aspect, and an antenna array of a plurality of antenna subarrays. A number of combinations of the plurality of antenna subarrays and available polarizations thereof corresponds to the number of antenna multiplexers. Each of the combinations of the plurality of antenna subarrays and available polarizations thereof is connected to a respective output from the antenna multiplexers.

According to a third aspect, there is provided a method for operating an active antenna system. An operating radio frequency band, out of at least two radio frequency bands, is determined, on which operating radio frequency band a transmission or reception is to be made. Transmission signals are provided to and/or reception signals are obtained from radio transceiver arrangements of at least two radio chain entities of one of at least two levels of radio chain entities, associated to a frequency range encompassing the operating radio frequency band. Each of the levels of radio chain entities is associated with a respective frequency range encompassing at least one radio frequency band each. At least two radio chain entities of a lower level of radio chain entities are comprised in a radio chain entity of a next higher level of radio chain entities. Each radio chain entity of the at least two levels of radio chain entities comprises a respective radio transceiver arrangement that is connected to a respective one of a number of antenna multiplexers. For all radio chain entities except a lowest level of radio chain entities, the respective radio transceiver arrangement is connected to the respective one of the number of antenna multiplexers via a splitter arrangement. Transmission signals are provided to and/or reception signals are obtained from $N_1$ antenna subarrays of an antenna array via the antenna multiplexers. The antenna array comprises $N_1$ combinations of antenna subarrays and available polarizations thereof.

An advantage of the proposed technology is that the wideband radio size becomes smaller and of less weight due to the use of few cavity filters for lower frequencies. This also lower the costs for wideband radio, lower the digital radio and baseband processing complexity, and lower the power consumption.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figures 1, 2:
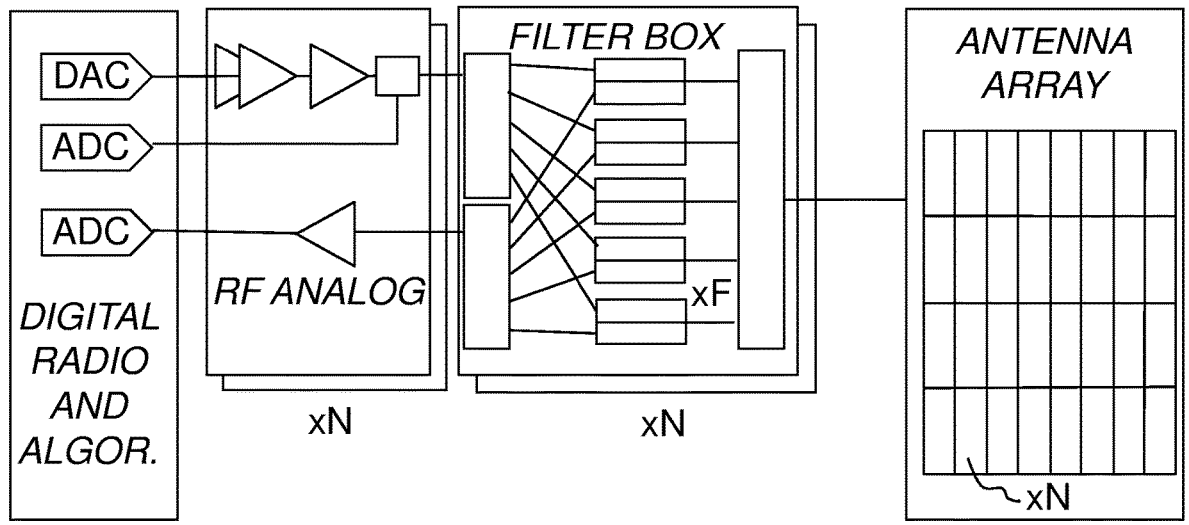
FIG. 1 illustrates an example of a frequency combined wideband radio.
FIG. 2 is a block diagram of an example of a wideband radio multi-band combination.

For a better understanding of the proposed technology, it may be useful to return to a brief overview of standard solution of a wideband radio equipment. FIG. 1 illustrates a schematic block diagram of an example of a wideband radio equipment.

The antenna array comprises N antenna elements, which are individually connected to a corresponding filter box. In this particular example, N=64, where each of the 32 antenna element areas are associated with two polarizations. Each combination of antenna element and polarization is connected by a separate connection to a respective filter box. In the filter box, filters for all the different frequency bands F are provided together with input and output multiplexers. In the present example, five different frequency bands are provided for. Typically, N filter boxes are provided, i.e. 64 in the present example.

The filter boxes are in turn connected to an RF analog unit, also one for each filter box. The RF analog unit has to be compatible with all frequencies of the used frequency bands. The RF analog units are then connected to a digital radio and algorithm unit, which may be configured to be common for all the signals. As a summary, N RF analog units have to be provided, all comprising wideband analog signal devices, such as e.g. wideband power amplifiers. Also, N filter boxes have to be provided, where each filter box is configured for filtering all F frequency bands, i.e. a total of N×F filter units. In the present example, 320 filter units have to be employed.

It is easily seen that such arrangements become complex, large and costly.

In FIG. 2, an example of a multi-band combination is presented. In this particular example, which will be utilized as a non-limiting illustrative example in the present disclosure, five bands B7, B3, B74, B28 and B71 are used, utilizing frequencies from 617 to 2690 MHz.

In order to simplify the design for a wideband active antenna system, one has to identify parts that are efficiently used for several frequency bands. One also has to consider if there are benefits in splitting wideband devices into several less-wideband devices in order to reduce the complexity of each device.

Starting with the antenna array, it can be concluded that the highest frequency intended to be used sets a limit on the antenna element size. At the same time, to have the possibility for achieving a useful antenna gain for the lowest frequency intended to be used, whole antenna array size has to be of a certain size. The antenna array can be divided into a plurality of antenna subarrays. An antenna subarray of the highest frequency intended to be used thus has to be decided by the limit of the corresponding antenna element size. Typically, each antenna subarray also has two polarizations. Each combination of the plurality of antenna subarrays and available polarizations thereof, if any, has to be fed by a signal to be transmitted, if used for transmission. In case of a receiver antenna, each combination of the plurality of antenna subarrays and available polarizations thereof, if any, will proved a received signal. This determines the maximum connections between the antenna array and the radio chain arrangement.

For a lower frequency, another division of the antenna array may be more beneficial. In such cases, the antenna array can be divided in virtual antenna subarrays. Each of these virtual antenna subarrays may comprise a number of the antenna subarrays associated with the highest frequency. In other words, the antenna subarrays associated with the highest frequency can be grouped together forming the different virtual antenna subarrays associated with a lower frequency. This can easily be achieved by communicating signals, split from a common signal, (possibly with a phase shift, as will be discussed further below), in the corresponding connections between the antenna array and the radio chain arrangement for the antenna subarrays within the same virtual antenna subarray.

The fact that split signals are communicated to and from antenna subarrays opens up for an approach to handle such identical signals by a common setup within the radio chain arrangement. In a first level, corresponding to the highest frequency intended to be used, different signals are communicated to the different antenna subarrays. In a second level (or as discussed further below, third or further level), split signals are communicated to the antenna subarrays comprised in an associated virtual antenna subarray. In order to simplify the radio chain arrangement, each set of these split signals may be provided for by a single radio chain unit before the split is made.

The provision of different sets of virtual antenna subarrays can also be generalized to more than two levels. In such cases, each level has its own set of split signals communicated to and from the antenna subarrays.

The different levels of virtual antenna subarrays are suitable for different frequency ranges. Depending on the frequency bands that are to be used, one or several frequency bands may use each level of virtual antenna subarrays. In the example set of FIG. 2, it may be considered that the highest frequency band B7 needs it own first level of (virtual) antenna subarrays. Preferably, this corresponds to the actual set of antenna subarrays. The frequency bands B3 and B74, the "mid frequency bands", may utilize a same, second, level of virtual antenna subarrays, since their frequency ranges are located in the vicinity of each other. This second layer thus becomes associated with two frequency bands. The frequency bands B28 and B71, the "low frequency bands", may utilize a same, third, level of virtual antenna subarrays, since their frequency ranges also are located in the vicinity of each other. This third layer thus also becomes associated with two frequency bands.

Figure 3A:
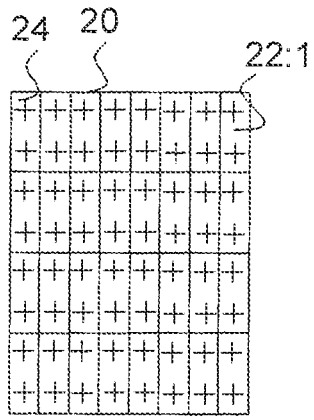
FIGS. 3A-C are schematic drawings of embodiments of flexible virtual subarray sizes for wideband antenna arrays.
Figure 3B:
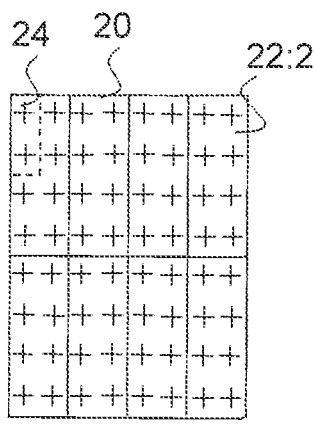
Figure 3C:
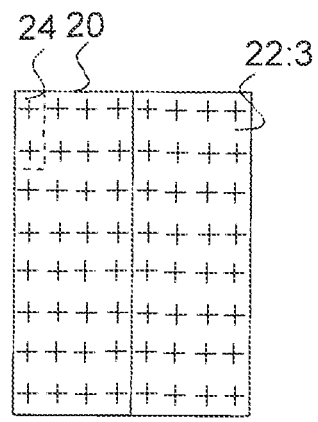

This example may be illustrated by FIGS. 3A-C. FIG. 3A illustrates an antenna array 20 with antenna subarrays 24. Each antenna subarray comprises two polarizations. FIG. 3A illustrates an antenna array 20 with a first level set of virtual antenna subarrays 22:1, for this particular example in a 64TR4x1 design, intended for a frequency of 2700 MHz. 32 virtual antenna subarrays 22:1 with two polarizations each are provided in an 8x4 configuration. In FIG. 3A, the actual antenna subarrays 24 are the same as the virtual antenna subarrays 22:1.

FIG. 3B illustrates a second level set of virtual antenna subarrays 22:2, for this particular example in a 16TR8x2 design, intended for a frequency of 1400 MHz. 8 virtual antenna subarrays 22:2 with two polarizations each are provided in a 4x2 configuration. Each virtual antenna subarrays 22:2 thus comprises four actual antenna subarrays 24.

FIG. 3C illustrates a first level set of virtual antenna subarrays 22:3, for this particular example in a 4TR16x4 design, intended for a frequency of 600 MHz. 2 virtual antenna subarrays 22:3 with two polarizations each are provided in a 2x1 configuration. Each virtual antenna subarrays 22:3 thus comprises sixteen actual antenna subarrays 24.

Figure 4:
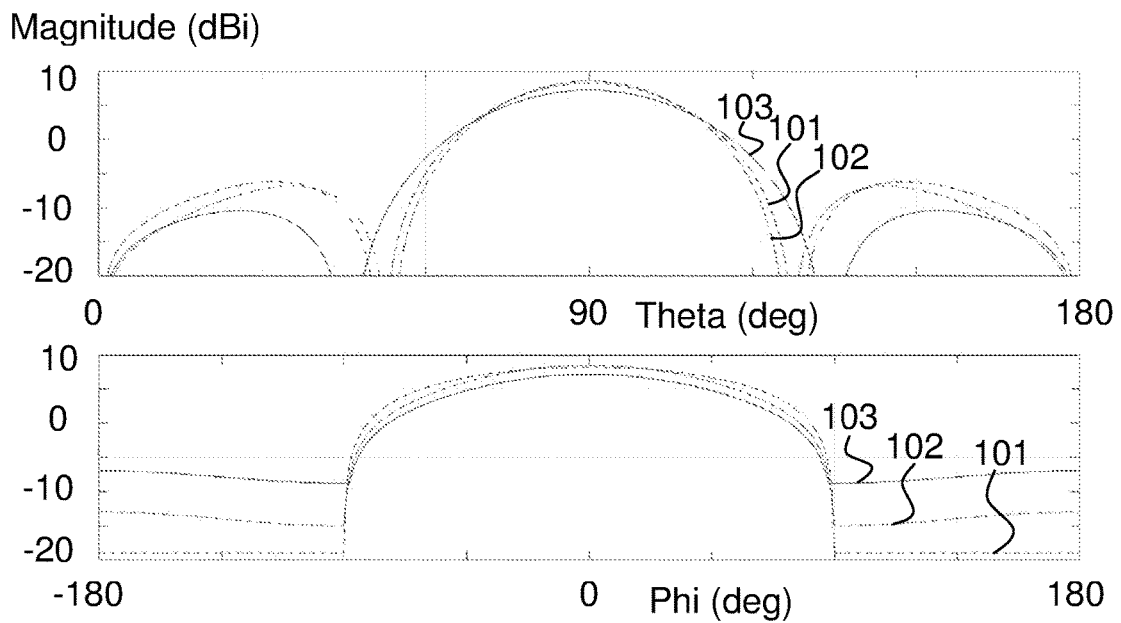
FIG. 4 are diagram illustrating subarray radiation patterns.

Based on the above subarray division, the subarray radiation pattern as illustrated in FIG. 4 for vertical and horizontal beam width is achieved. For both high 101, mid 102 and low 103 part, i.e. the first, second and third level, the radiation behaviour is similar. The vertical (theta) beam width is around 33 degrees, the horizontal (phi) beam width is around 120 degrees. All the bands have similar coverage behaviour. This is advantageous for wideband radio deployment.

The number of connections between antenna array and the radio chain arrangement is determined by the number of virtual antenna subarrays of the first level, i.e. the level corresponding to the highest frequency. Since these connections are intended to be used for all levels, an antenna multiplexer has to be provided for each connection in order to switch between radio chain entities of different levels.

The proposed solution is use flexible subarray size of the antenna array based on the working frequency, so for each frequency, the best performance can be achieved in much lower complexity.

In this concept, the antenna element size is still decided by the highest frequency in the covered radio band, but there are several levels of subarrays. In other words, the highest frequency decides the first level of subarrays. The RF interface 3 between the antenna array and the filter box is also decided by the first level of subarrays. A combination and rearranging of the first level of subarrays form the second level of subarrays, e.g. for mid frequency, and if being present, analogously for any third or higher level of subarrays for even lower frequencies.

One concept behind this basic idea is that for wideband radio, such as covering frequency ranges of e.g. 5:1, the low frequency beam width is several times broader compared to high frequency beams. Therefore, the low frequency beams do not need the same level of freedom for beam steerability, even if the same subarray division is kept. In other words, for the low frequencies, it is very hard to get same benefits as for high frequency bands.

Figure 5:
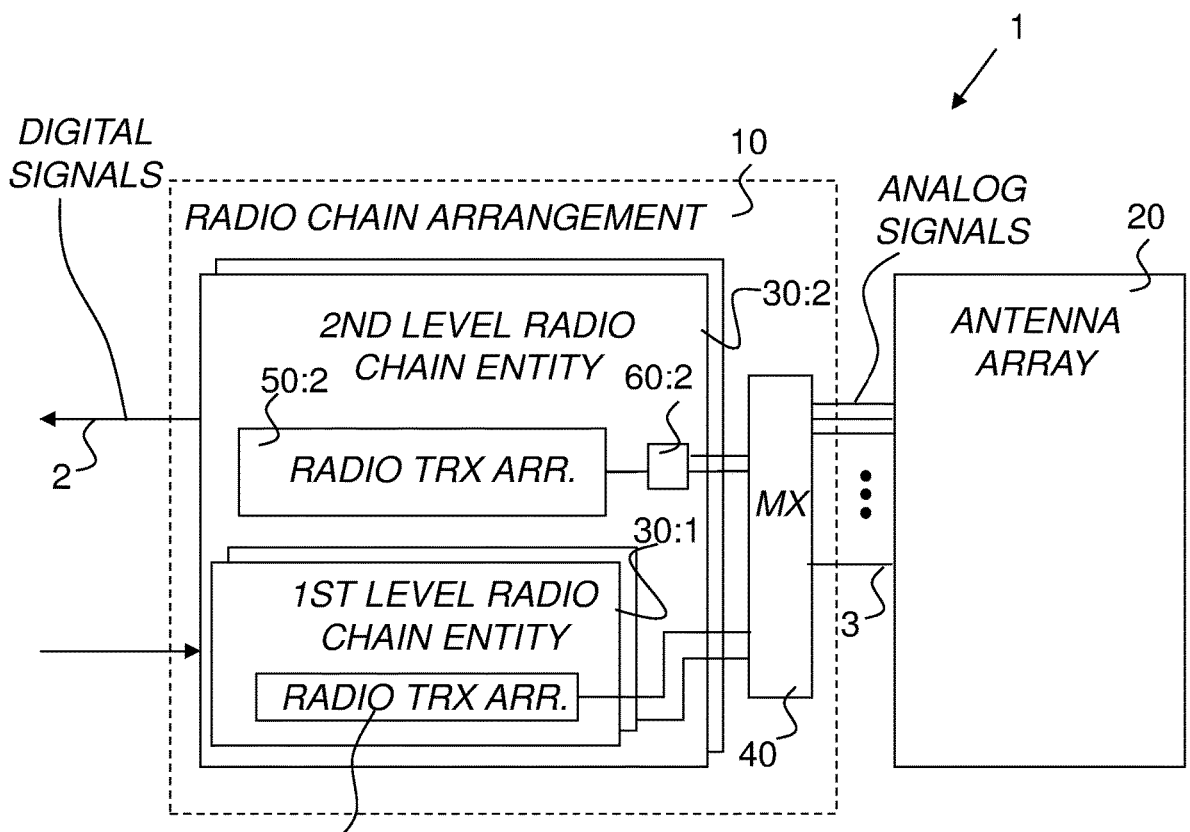
FIG. 5 is a schematic block diagram of an embodiment of a radio chain arrangement.

FIG. 5 illustrates an embodiment of an active antenna system 1. The active antenna system 1 comprises a radio chain arrangement 10, which in this embodiment and for simplify the illustration comprises two levels of radio chain entities 30:1, 30:2. As will be discussed elsewhere, there may be more levels of radio chain entities. Thus, the radio chain arrangement comprises at least two levels of radio chain entities 30:1, 30:2. Each of the levels of radio chain entities 30:1, 30:2 are associated with a respective frequency range encompassing at least one radio frequency band each.

The radio chain entities 30:1, 30:2 are arranged in a layer-on-layer structure, meaning that radio chain entities 30:1 of a lower layer are provided within a radio chain entity 30:2 of a higher layer. In the figure, the second level radio chain entities 30:2 have at least two first level radio chain entities 30:1. provided therein. In other words, at least two radio chain entities of a lower level of radio chain entities 30:1 are comprised in a radio chain entity of a next higher level of radio chain entities 30:2. This means that a radio chain entity 30:2 being associated with a certain frequency range comprises at least two radio chain entities 30:1 being associated with a higher frequency range.

Each radio chain entity 30:1, 30:2 has a respective radio transceiver arrangement 50:1, 50:2. More specific, related to this specific embodiment, all first level radio chain entities 30:1 comprises one respective first level radio transceiver arrangement 50:1. Similarly, all second level radio chain entities 30:2 comprises one respective second level radio transceiver arrangement 50:2, besides the first level radio chain entities 30:1. Each radio chain entity 30:1, 30:2 of the at least two levels of radio chain entities thus comprises a respective radio transceiver arrangement 50:1, 50:2, which is connected to at least a respective one of a number of antenna multiplexers 40.

In the embodiment of FIG. 5, the first level radio transceiver arrangements 50:1 are directly connected to the multiplexor 40, while the second level radio transceiver arrangements 50:2 are connected to the multiplexor 40 via a splitter arrangement 60:2. In a general case, for all radio chain entities 30:2 except a lowest level of radio chain entities 30:1, the respective radio transceiver arrangement 50:2 are connected to the respective one of the number of antenna multiplexers 40 via a splitter arrangement 60:2. The splitter arrangement 60:2 splits the signal from the second level radio transceiver arrangement 50:2 into the same number of signals that equals the number of first level radio chain entities 30:1 comprised in each second level radio chain entity 30:2. This means that there is the same total number of signals emanating from the first layer radio transceiver arrangements 50:1 entering the multiplexer 40 compared to the total number of signals emanating from the second layer radio transceiver arrangements 50:2 entering the multiplexer 40.

For embodiments with more than two levels, the total number of signals emanating from each one of the layers of radio transceiver arrangements 50 is the same. Described differently, every one of the layers of radio transceiver arrangements 50 provides the same number of signals as the first level of radio transceiver arrangements. Consequently, the total number of signals entering the multiplexer 40 is the same, independently of which layer of radio transceiver arrangements that is used at the moment.

The respective multiplexers 40 are associated with a specific radio chain entity of the highest level. For example, if there are three levels of radio chain entities and there are four radio chain entities of the third level, there are also four multiplexers 40. However, these multiplexers 40 may of course be designed as one common entity, although the operation preferably separates the signals from each individual radio chain entity of the highest level.

The multiplexer 40 is arranged for selecting one of the levels of input signals to be outputted towards the antenna array. The number of outputted signals thus also corresponds e.g. the total number of signals emanating from the first layer radio transceiver arrangements 50:1. The total number of outputted signals from all multiplexers 40 also corresponds to the highest number of virtual antenna arrays of the antenna array, i.e. the division corresponding to the highest frequency range associated with the lowest level of antenna array division, see e.g. FIG. 3A.

Digital signals 2 are thus received by the radio chain arrangement 10 and are processed by the radio transceiver arrangement 50:1, 50:2 of the level associated to the frequency on which the signals are to be transmitted. The signals are provided to the multiplexers 40 and are outputted as analogue signals 3 to the antenna array 20.

The above description has assumed that a transmission mode was considered. However, the analogue behaviour and design is valid also for reception of signals. Received signals from the antenna array are brought as analogue signals to the multiplexers 40, which selects to transfer the signals to the radio transceiver arrangements 50:1, 50:2 of the appropriate level being associated with the frequency on which the signals were received. The respective radio transceiver arrangements 50:1, 50:2 process the signals into digital signals, which are outputted from the radio chain arrangement 10.

Even though it is perfectly feasible to let different radio chain entities of a same level having different numbers of incorporated radio chain entities of lower levels, it is preferred all radio chain entities of a certain level have the same numbers of incorporated radio chain entities of the level below. This preferred condition then requires that there is a fixed integer ratio between the number of radio chain entities of the different levels.

In a preferred embodiment, the radio chain arrangement comprises $N_1$ first level radio chain entities. The first level radio chain entities are associated with a first frequency range encompassing at least one first level radio frequency band. Each of the first level radio chain entities has a respective first level radio transceiver arrangement that is connected to a respective one of $N_1$ antenna multiplexers. Each of the first level radio chain entities is comprised in one of $N_2$ second level radio chain entities. Thereby, each second level radio chain entity comprises a set of at least one of the first level radio chain entities.

The second level radio chain entities are associated with a second frequency range encompassing at least one second level radio frequency band. The second frequency range is situated at lower frequencies than the first frequency range. Each of the second level radio chain entities has a respective second level radio transceiver arrangement connected via second level splitter arrangements to $N_1/N_2$ respective antenna multiplexers of the $N_1$ antenna multiplexers. $N_1$ is an integer $\geq 4$, $N_2$ is an integer $\geq 2$ and $N_1/N_2$ is an integer $\geq 2$.

These ideas can be extrapolated to a third level. In one embodiment of a radio chain arrangement, each of the second level radio chain entities is comprised in one of $N_3$ third level radio chain entities. Thereby, each third level radio chain entity comprises a set of at least one of the second level radio chain entities. The third level radio chain entities are associated with a third frequency range encompassing at least one third level radio frequency band. The third frequency range is situated at lower frequencies than the second frequency range. Each of the third level radio chain entities has a respective third level radio transceiver arrangement connected via third frequency level splitter arrangements to $N_1/N_3$ respective antenna multiplexers of the $N_1$ antenna multiplexers. $N_3$ is an integer $\geq 2$ and $N_1/N_3$ is an integer $\geq 3$.

These ideas can also be extrapolated to an arbitrary level. In one embodiment of a radio chain arrangement, for each integer n of $3 \leq n \leq n_x$, where $n_x$ is an integer $\geq 3$, each of a nth level radio chain entities is comprised in one of $N_{n+1}$ (n+1)th level radio chain entities. Thereby each (n+1)th level radio chain entity comprises a set of at least one of the nth level radio chain entities. The (n+1)th level radio chain entities are associated with a (n+1)th frequency range encompassing at least one (n+1)th level radio frequency band. The (n+1)th frequency range is situated at lower frequencies than the nth frequency range. Each of the (n+1)th level radio chain entities has a respective (n+1)th level radio transceiver arrangement connected via (n+1)th level splitter arrangements to $N_1/N_{n+1}$ respective antenna multiplexers of the $N_1$ antenna multiplexers. $N_{n+1}$ is an integer $\geq 2$ and $N_1/N_{n+1}$ is an integer $\geq n+1$.

Figure 6:
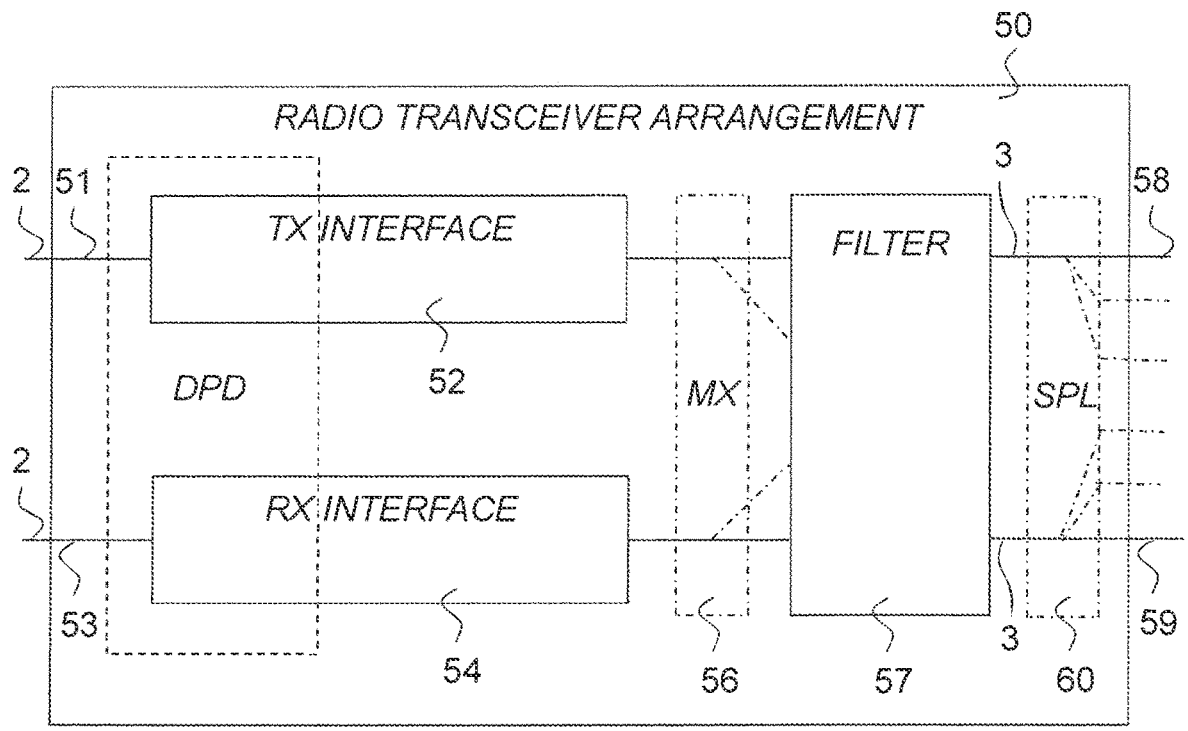
FIG. 6 is a schematic block diagram of an embodiment of a radio transceiver arrangement.

FIG. 6 illustrates an embodiment of a radio transceiver arrangement 50. Digital signals 2 are received on an input 51 to a transmitter interface 52. The transmitter interface 52 is configured to perform a transfer of the digital signal 2 into an analog signal 3 and comprises typically different digital-to-analog converters and power amplifier arrangements. These arrangements are adapted to the frequency range to which the radio transceiver arrangement 50 is associated. Due to the division into the level structure, the transmitter interface 52 is typically not of a wideband type. Depending on e.g. the associated frequency range, the transmitter interface 52 may comprise parts of a DPD function 55. Such arrangements are, as such, well known in prior art and easily available for anyone skilled in the art and will therefore not be further discussed in detail.

The treated signals are provided to a filter box, where an appropriate frequency range is selected, e.g. by use of bandpass filters. Finally, the analog signals 3 are provided on an output 58 from the radio transceiver arrangement 50. If the radio transceiver arrangement 50 is not of the first level, the analog signals 3 are split in a splitter arrangement 60 into several identical signals on a plurality of outputs 58. The number of split signals equals the number of radio chain entities of a lower level incorporated in the radio chain entity in which the radio transceiver arrangement 50 is situated.

An analog receiver path is also provided. Analog signals 3 are received on one or several inputs 59. The analog signals 3 may be added together in a splitter if multiple inputs 59 are provided. The analog signals 3 are filtered in the filter box 57 to a suitable frequency range and provided to a receiver interface 54. The receiver interface 54 is configured to perform a transfer of the analog signal 3 into a digital signal 3 and comprises typically different analog-to-digital converters. These arrangements are adapted to the frequency range to which the radio transceiver arrangement 50 is associated. Due to the division into the level structure, the receiver interface 54 is typically not of a wideband type. Depending on e.g. the associated frequency range, the receiver interface 54 may comprise parts of the DPD function 55. Such arrangements are, as such, well known in prior art and easily available for anyone skilled in the art and will therefore not be further discussed in detail. A digital signal 2 is provided on an output 53 from the receiver interface 54.

In other words, in one embodiment of a radio chain arrangement, each radio transceiver arrangement has a transmitter interface and a receiver interface connected via a filter arrangement to the $N_1$ antenna multiplexers. Thereby, each transmitter interface and each receiver interface are adapted to the respective frequency range. Also, each of the filter arrangements is configured to operate in the respective radio frequency band.

In a preferred embodiment, the frequency ranges associated with the different levels of radio chain entities may comprise more than one frequency band. In this way, many of the arrangements within the radio chain arrangement can be reused for several frequency bands. A corresponding radio transceiver arrangement 50 then comprises a selecting arrangement 56 provided between the transmitter interface 52 or receiver interface 54 and the filter box 57. The selecting arrangement 56 may, depending on e.g. the frequencies in question, be constituted by a multiplexer, band pass filters, high-pass-filters and/or low-pass filters. How to achieve such a selecting operation is, as such, well-known in the art and is therefore not further discussed. The filter box 57 consequently comprises one set of filters for each frequency band comprised in the frequency range associate with the radio transceiver arrangement 50.

In other words, in a preferred embodiment, at least one of the frequency ranges encompasses at least two radio frequency bands, wherein transmitter interfaces and receiver interfaces associated with such a frequency range are connected via a selecting arrangement to a respective frequency filter arrangement.

The above described antenna subarray division is a virtual subarray division. However, the configuration of the whole AAS radio has to be adapted accordingly. The antenna is a wideband antenna and will be used for many different frequencies. The division of the radio chain arrangement into levels, and reuse of different parts reduces the complexity, the weight and the costs.

The large possibilities to vary the number of levels, the number of frequency bands for each level, the ratio between the number of virtual antenna arrays between different levels etc., may cause some difficulties for a reader to fully appreciate the advantages and possibilities thereof. Therefore, in the following sections, an example embodiment will be thoroughly described, for a particular choice of levels, virtual antenna arrays etc. The reader has, however, to bear in mind that most features discussed for this particular embodiment also can be employed for the more general embodiments.

The following embodiment is based on a scenario of using the five frequency bands presented in FIG. 2, and an antenna level division according to the FIGS. 3A-C. In this example, the first level is also denoted as a "high frequency" level comprising the single frequency band 7, the second level is also denoted as a "medium frequency" level comprising the two frequency bands 3 and 74, and the third level is also denoted as a "low frequency" level comprising the two frequency bands 71 and 28.

Figure 7:
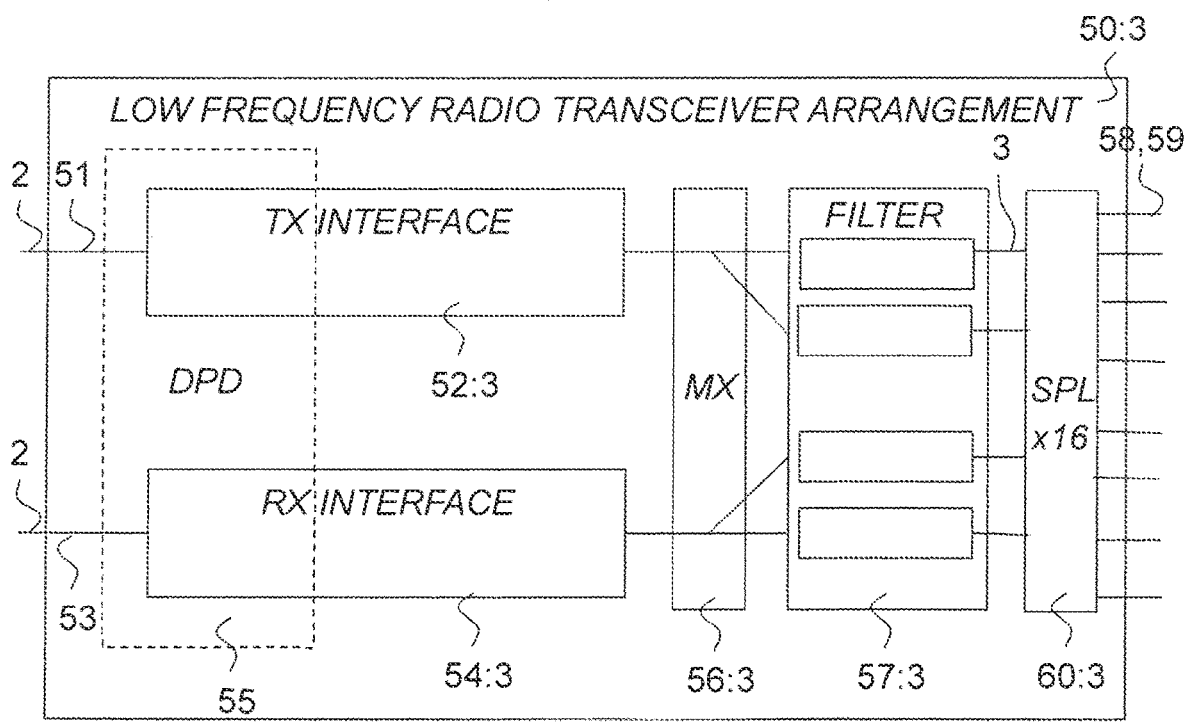
FIG. 7 is a schematic block diagram of an embodiment of a low-frequency level radio transceiver arrangement.

FIG. 7 illustrates schematically an embodiment of a low frequency radio transceiver arrangement. In the notations used further above, this would be a third level radio transceiver arrangement 50:3. The third level transmitter interface 52:3 and the third level receiver interface 54:3 are in this embodiment adapted to operate at frequencies covering both frequency band 71 and frequency band 28. The third level selecting arrangement 56:3 is in this embodiment configured to enable a selection between two different sets of filter arrangements within the third level filter box 57:3. One set of filters is adapted to operate within the frequency band 71 and the other set of filters is adapted to operate within the frequency band 28. The third level filter box 56:3 is connected to a third level splitter arrangement 60:3, which is arranged to split one signal into 16 identical signals on the output side or equivalent, add 16 incoming received signals into one common received signal. The number 16 is determined by the fact that the virtual antenna array of the first level comprises 16 times as many elements compared to the third level virtual antenna array. There are in total 4 low frequency radio transceiver arrangements provided in the radio chain arrangement of the present embodiment.

Figure 8:
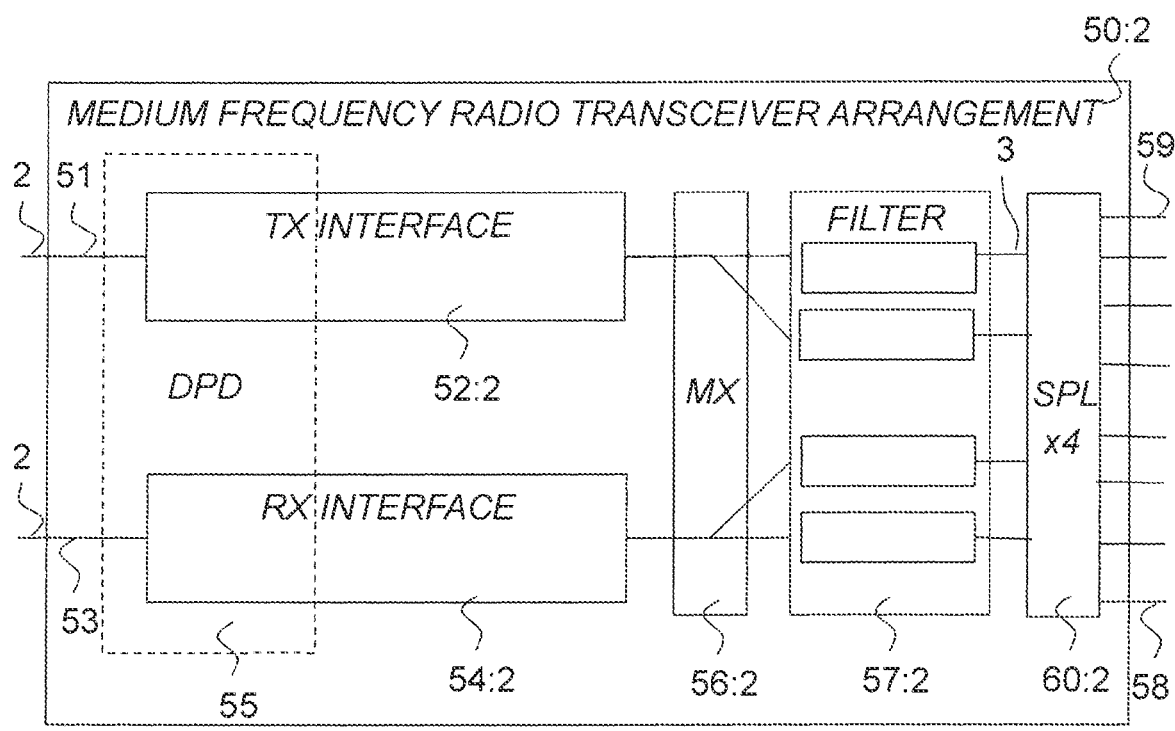
FIG. 8 is a schematic block diagram of an embodiment of a medium-frequency level radio transceiver arrangement.

FIG. 8 illustrates schematically an embodiment of a medium frequency radio transceiver arrangement. In the notations used further above, this would be a second level radio transceiver arrangement 50:2. The second level transmitter interface 52:2 and the second level receiver interface 54:2 are in this embodiment adapted to operate at frequencies covering both frequency band 3 and frequency band 74. The second level selecting arrangement 56:2 is in this embodiment configured to enable a selection between two different sets of filter arrangements within the second level filter box 57:2. One set of filters is adapted to operate within the frequency band 3 and the other set of filters is adapted to operate within the frequency band 74. The second level filter box 56:2 is connected to a second level splitter arrangement 60:2, which is arranged to split one signal into 4 identical signals on the output side or equivalent, add 4 incoming received signals into one common received signal. The number 4 is determined by the fact that the virtual antenna array of the first level comprises 4 times as many elements compared to the second level virtual antenna array. There are in total 16 medium frequency radio transceiver arrangements provided in the radio chain arrangement of the present embodiment, provided in groups of four in a respective low frequency radio transceiver arrangement.

Figure 9:
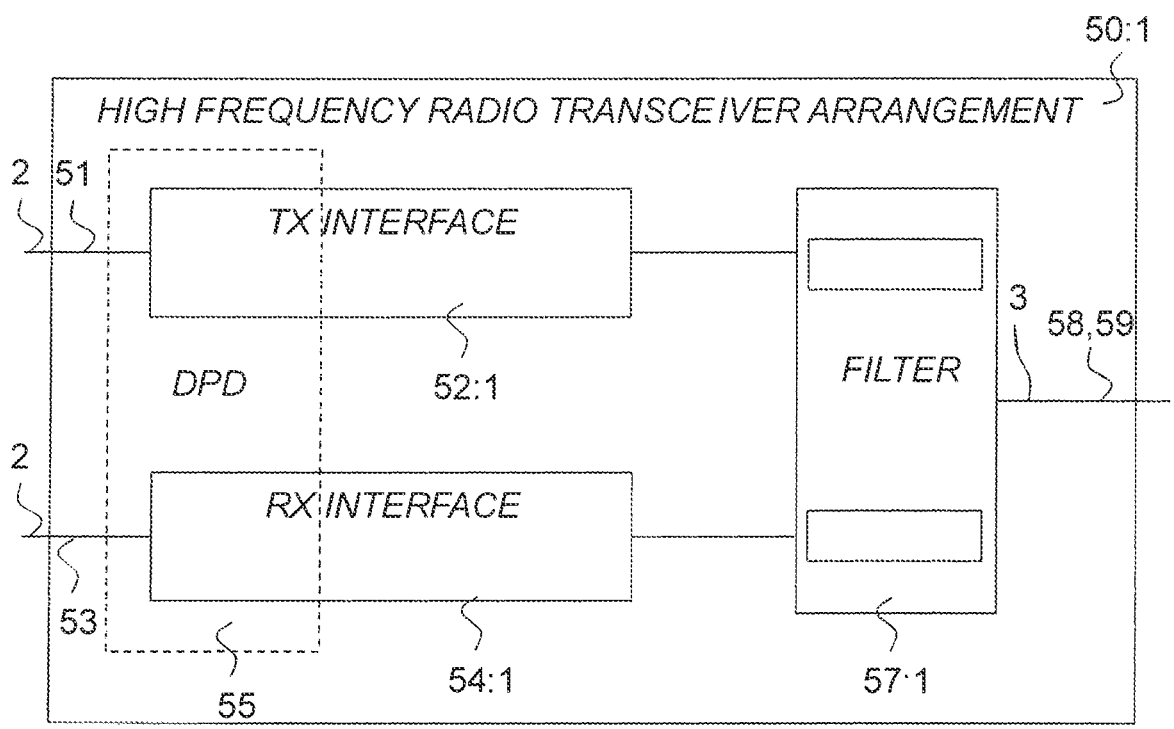
FIG. 9 is a schematic block diagram of an embodiment of a high-frequency level radio transceiver arrangement.

FIG. 9 illustrates schematically an embodiment of a high frequency radio transceiver arrangement. In the notations used further above, this would be a first level radio transceiver arrangement 50:1. The first level transmitter interface 52:1 and the first level receiver interface 54:1 are in this embodiment adapted to operate at frequencies covering frequency band 7. The first level selecting arrangement 56:1 is in this embodiment does not comprise any selection arrangement, since only one sets of filter arrangements is provided within the first level filter box 57:1. The single set of filters is adapted to operate within the frequency band 7. The first level filter box 56:1 is not connected to any splitter arrangement. There are in total 64 high frequency radio transceiver arrangements provided in the radio chain arrangement of the present embodiment, provided in groups of four in a respective medium frequency radio transceiver arrangement, (also see FIG. 10).

The first, second and third level radio transceiver arrangements are then arranged in radio chain entities in a level structure.

Figure 10:
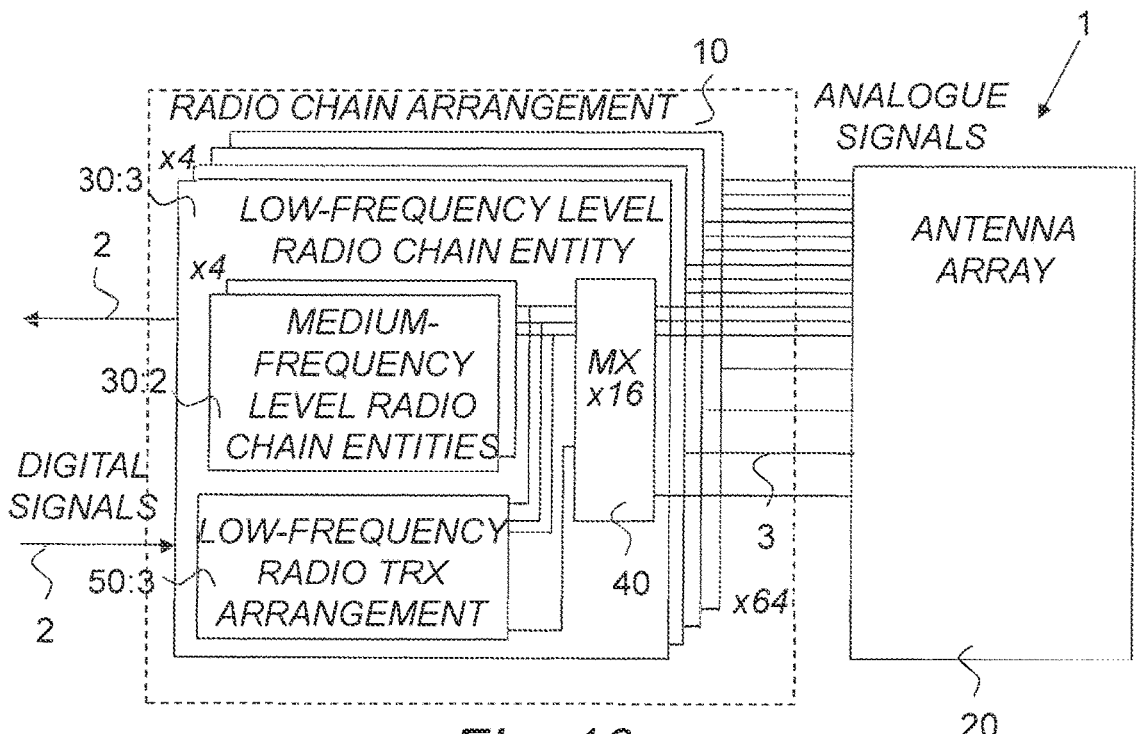
FIG. 10 is a schematic drawing of an embodiment of an active antenna system.

FIG. 10 illustrates schematically an active antenna system 1 comprising an antenna array of a plurality of antenna subarrays and a radio chain arrangement 10. The highest level, in this embodiment, the third level of radio chain entities 30:3 are illustrated. In this embodiment four third level of radio chain entities 30:3, i.e. low-frequency level radio chain entities, are provided. Each third level radio chain entity 30:3 comprises a third level radio transceiver arrangement i.e. a low-frequency radio transceiver arrangement, typically configured according to FIG. 7. The third level radio transceiver arrangement 50:3 provides 16 connections for input/output of analog signals, connected to a multiplexer 40. Each third level radio chain entity 30:3 also comprises four second level radio chain entities 30:2. Each second level radio chain entity provides 4 connections for input/output of analog signals, also connected to the multiplexer 40. The multiplexer 40 selects between these sets of analog signals and provides, dependent on the prevailing frequency band, one of the sets towards the antenna array Each third level radio chain entity 30:3 thus always provides/receives 16 signals, which means that the radio chain arrangement 10 as a whole provides 64 signals.

Figure 11:
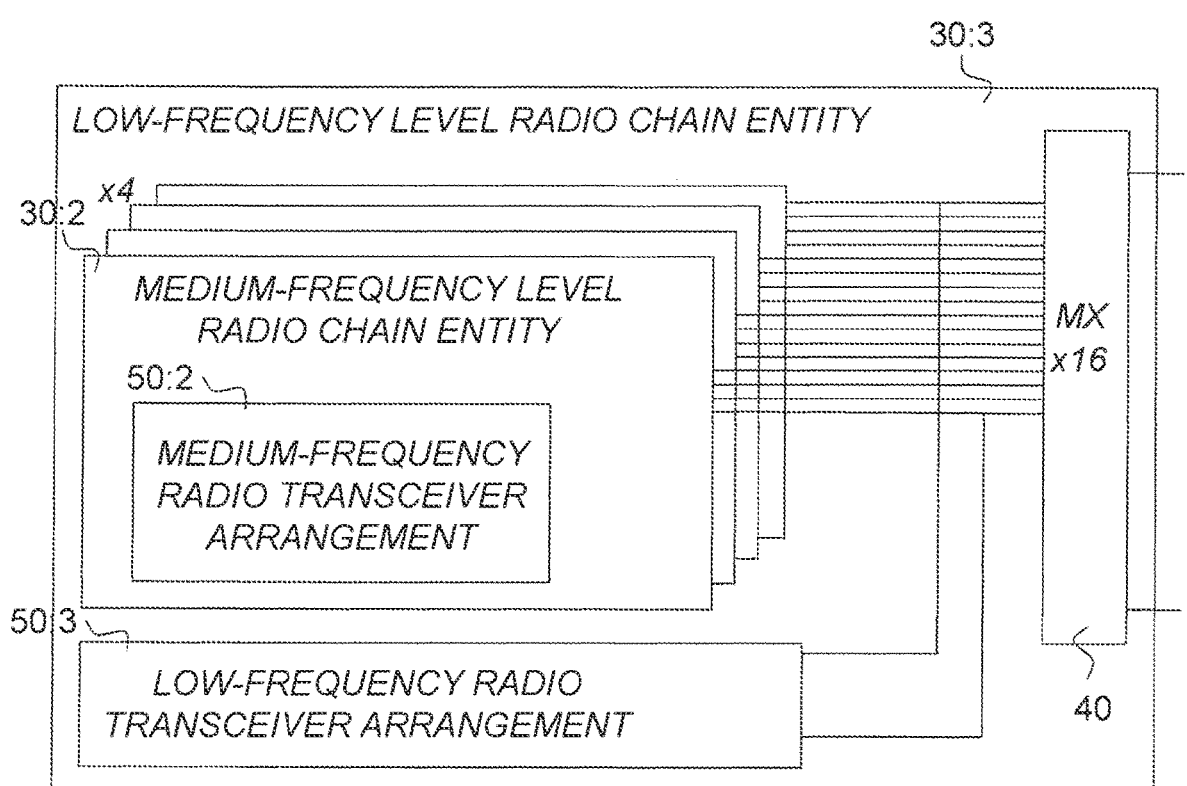
FIG. 11 is a schematic block diagram of an embodiment of a low-frequency level radio chain arrangement.

FIG. 11 illustrates one third level radio chain entity 30:3 of FIG. 10 in a little bit more detail. It can here be seen that each of the four second level radio chain entities 30:2, i.e. each of the four medium-frequency level radio chain entities, comprises a second level radio transceiver arrangement i.e. a medium-frequency radio transceiver arrangement. Each second level radio chain entity 30:2 thus always provides/receives 4 signals, which means that each third level radio chain entity 30:3 as a whole provides 16 signals.

Figure 12:
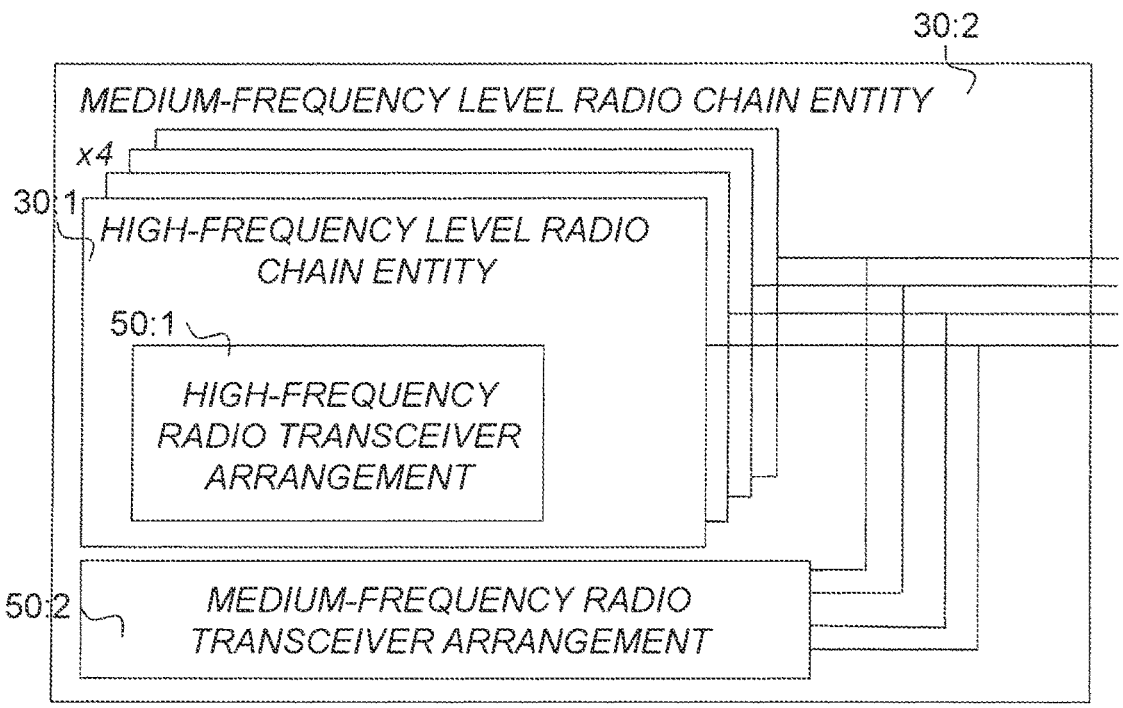
FIG. 12 is a schematic block diagram of an embodiment of a medium-frequency level radio chain arrangement.

FIG. 12 illustrates one second level radio chain entity 30:2 of FIG. 11 in a little bit more detail. The second level radio chain entity 30:2 comprises a second level radio transceiver arrangement 50:2, i.e. a medium-frequency radio transceiver arrangement, preferably according to FIG. 8. This means that in one aspect, the second level radio chain entities 30:2 can be interpreted as corresponding to a "lower level", lower than the next higher level, i.e. the third level above. The second level radio transceiver arrangement 50:2 provides 4 connections for input/output of analog signals, eventually connected to the multiplexer at the third level. The second level radio chain entity 30:2 also comprises four first level radio chain entities 30:1. It can here be seen that the first level radio chain entities 30:1, i.e. the high-frequency level radio chain entities, in turn comprises a respective first level radio transceiver arrangement 50:1, i.e. a high-frequency radio transceiver arrangement. In one aspect, the level radio chain entities 30:1 can be interpreted as corresponding to a lower, or even lowest, level, lower than the next higher level, i.e. here the second level, mentioned above. Each first level radio chain entity 30:1 thus always provides/receives 1 signal, which means that each second level radio chain entity 30:2 as a whole provides 4 signals.

In one embodiment, where $N_k$ denote the number radio chain entities of level k, $N_1=64$, $N_2=16$ and $N_3=4$. The first level is then a high-frequency level, the second level is a medium-frequency level and the third level is a low-frequency level.

In one further embodiment, the frequency range associated with the high-frequency level encompasses one frequency band, the frequency range associated with the medium-frequency level encompasses two frequency bands and the frequency range associated with said low-frequency level encompasses two frequency bands.

In one even further embodiment, a first low-frequency filter arrangement of the low-frequency filter arrangements operates with an uplink radio frequency band between 663 and 698 MHz and a downlink radio frequency band between 617 and 652 MHz, a second low-frequency filter arrangement of the low-frequency filter arrangements operates with an uplink radio frequency band between 703 and 748 MHz and a downlink radio frequency band between 758 and 803 MHz, a first medium-frequency filter arrangement of the medium-frequency filter arrangements operates with an uplink radio frequency band between 1427 and 1470 MHz and a downlink radio frequency band between 1475 and 1518 MHz, a second medium-frequency filter arrangement of the medium-frequency filter arrangements operates with an uplink radio frequency band between 1710 and 1785 MHz and a downlink radio frequency band between 1805 and 1880 MHz, and the high-frequency filter arrangement operates with an uplink radio frequency band between 2500 and 2570 MHz and a downlink radio frequency band between 2620 and 2690 MHz.

Depending on the actual set of frequency bands, there may be choices of e.g. transmitter interfaces and receiver interfaces for one level of radio transmitter arrangements that are well operable also in frequency ranges being associated to another level of radio transceiver arrangements. In such cases, further re-utilization of equipment may be configured.

Figure 13:
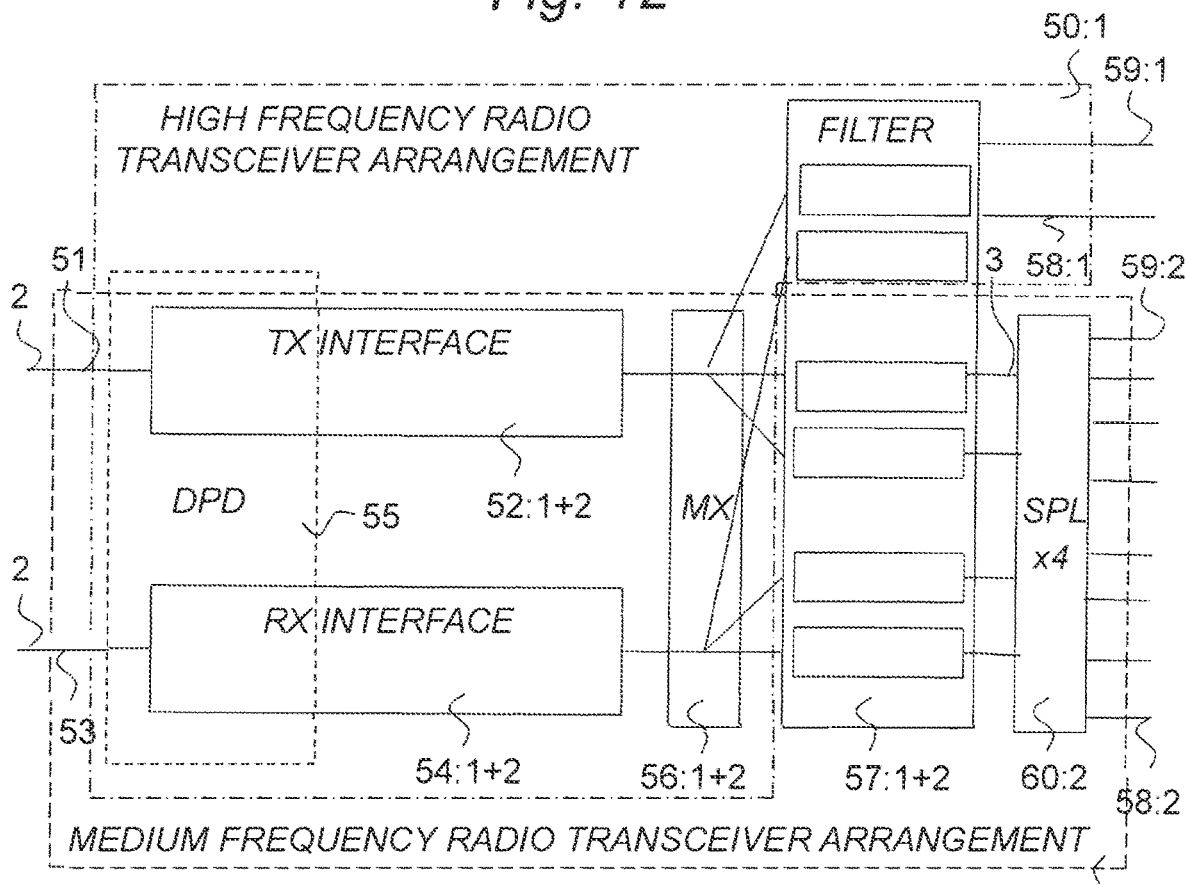
FIG. 13 is a schematic block diagram of an embodiment of a combination of a high-frequency level radio transceiver arrangement and a medium-frequency level radio transceiver arrangement.

Again, using the example setup of five frequency bands divided into three levels described above, a further or alternative embodiment can be presented. In FIG. 13, a schematic illustration of another embodiment of a combined medium and high frequency radio transceiver arrangement is illustrated. A medium frequency radio transceiver arrangement 50:2 is arranged basically in the same way as in FIG. 8. However, the combined transmission interface 52:1+2 and the combined receiving interface 54:1+2 are possible to use also in one of the high frequency radio transceiver arrangements 50:1. The combined selecting arrangement 56:1+2 is used to separate the signals to different filter sets in the combined filter box 57:1+2. The signals belonging to the medium frequency bands 58:2, 59:2 are as above provided to/received from a splitter arrangement 60:2, while the signals belonging to the high frequency bands are directly connected 58:1, 59:2 to a multiplexer unit (not seen in this figure).

This reuse of parts of the radio transceiver arrangements for different level reduces the needed number of transmission interfaces and receiving interfaces. However, the complexity of the transmission interfaces and receiving interfaces may be higher. Also, the complexity of the selecting arrangements increases. However, if such increases in complexity are low, there might anyway be an advantage to reduce the overall number of transmission interfaces and receiving interfaces.

Figure 14:
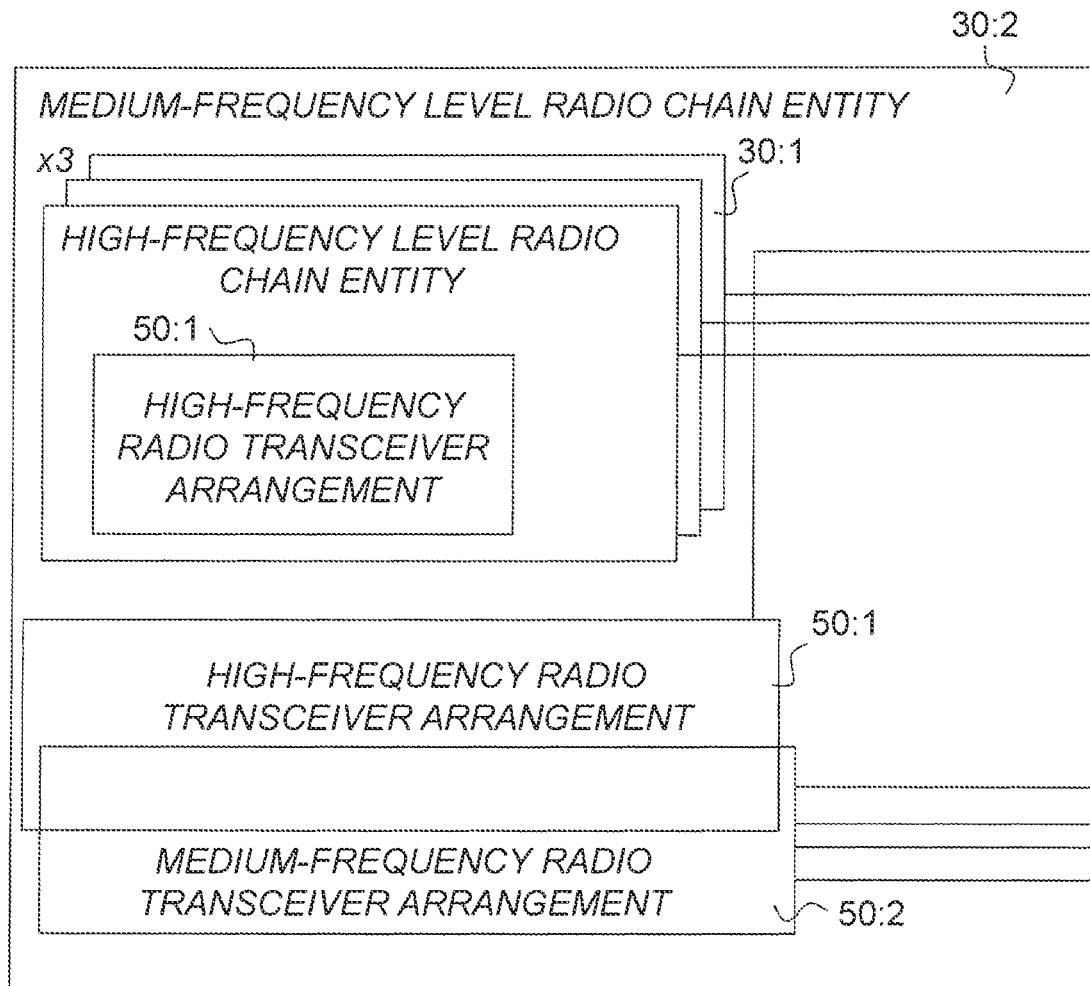
FIG. 14 is a schematic block diagram of an embodiment of a medium-frequency level radio chain arrangement utilizing a combination according to FIG. 13.

FIG. 14 illustrates a medium-frequency level radio chain entity 30:2 where one high-frequency radio transceiver arrangement 50:1 is combined with the medium-frequency radio transceiver arrangement 50:2. The number of high-frequency level radio chain entities 30:1 comprised in the medium-frequency level radio chain entity 30:2 is thereby reduced by one unit compared to the setup in FIG. 12.

In a general approach, re-use of transmission interfaces and receiving interfaces between two consecutive levels of radio chain entities can reduce the number of the lower-level radio chain entities comprised in the higher-level chain entity by one unit.

As was mentioned further above, the principles illustrated by the FIGS. 7 to 14 can be applied to configurations with other number of levels, other relations between antenna arrays etc. It can however be considered that in order to facilitate the configuration, in a preferred embodiment, different entities of each level are configured identically. In other words, preferably, all first level radio chain entities of a radio chain arrangement are identical, all second level radio chain entities of a radio chain arrangement are identical, and all third level radio chain entities of a radio chain arrangement are identical.

In a somewhat more mathematical approach, let $N_k$ denote the number radio chain entities of level k. Preferably, $N_{k-1}/N_k$ are integers for each k from 2 and up to the highest level of radio chain entities.

In one embodiment, $N_{k-1}/N_k$ are integers for each k=2 and up to the highest level of frequency level radio chain entities. The level k of frequency level radio chain entities comprises at least $N_{k-1}/N_{k-1}$ frequency level radio chain entities of level k-1.

In a further embodiment, a level k0 of frequency level radio chain entities comprises $N_{k0-1}/N_{k0-1}$ frequency level radio chain entities of level k0-1. The radio transceiver arrangement of level k0 thereby has a transmitter interface and a receiver interface capable of operating at frequencies of the frequency range of level k0-1 and are connected via a selecting arrangement of radio transceiver arrangement of level k0 to a filter arrangement configured to operate in a radio frequency band encompassed by the frequency range of level k0-1.

In another further embodiment, $N_{k-1}/N_k$ are integers for each k=2 and up to the highest level of frequency level radio chain entities, whereby level k of frequency level radio chain entities comprises $N_{k-1}/N_k$ frequency level radio chain entities of level k-1.

The ratio of radio chain entities can also be formalized. A ratio $r_L$ between the number of radio chain entities for one level and the number of radio chain entities for the next higher level is an integer equal to or larger than 2. Preferably, the ratio $r_L$ is equal to 4, corresponding to an increase of an associated virtual antenna array element by a factor of 2 in two directions.

As discussed above gives that in one embodiment, each radio chain entity of a level, except for the lowest level, comprises at least $r_L-1$ radio chain entities of a next lower level.

In an embodiment utilizing reuse, a radio chain entity of at least one level of radio chain entities, except for the lowest level, comprises $r_L-1$ radio chain entities of a next lower level. The radio transceiver arrangement of the radio chain entity of the at least one level of radio chain entities has a transmitter interface and a receiver interface capable of operating also at frequencies of the frequency range of the next lower level and are connected via a selecting arrangement of radio transceiver arrangement of the radio chain entity of the at least one level of radio chain entities to a filter arrangement configured to operate in a radio frequency band encompassed by the frequency range of the next lower level.

Without reuse, in one embodiment, each radio chain entity of a level, except for the lowest level, comprises $r_L$ radio chain entities of a next lower level.

Reconsider FIG. 5, there is illustrated an embodiment of an active antenna system 1. The active antenna system 1 comprises a radio chain arrangement 10 according to the above discussions. The active antenna system 1 further comprises an antenna array 20 of a plurality of antenna subarrays. A number of combinations of the plurality of antenna subarrays and available polarizations thereof corresponds to the number of antenna multiplexers 40 of the radio chain arrangement 10. Each of the combinations of the plurality of antenna subarrays and available polarizations thereof is connected to a respective output from the antenna multiplexers 40.

In one embodiment, for a highest used frequency band, the number of combinations of the plurality of antenna subarrays and available polarizations thereof is equal to $N_1$.

In one embodiment, the antenna subarrays have two polarizations each, whereby the antenna array has $N_1/2$ antenna subarrays.

In one embodiment, the antenna array is dividable in levels of virtual antenna subarrays, being associated with a respective one of said levels of radio chain entities. Thereby, the number of combinations of the virtual antenna subarrays of a specific level and available polarizations is equal to the number of radio chain entities of the specific level.

In a further embodiment, for each polarization, all antenna subarrays in each of the virtual antenna subarrays are connected to the frequency filter arrangement in a respective radio chain entity.

The whole antenna vertical and horizontal beam characteristic of the example system discussed above is illustrated in FIG. 15. The graph 104 corresponds to the 2700 MHz frequency band, the graph 105 corresponds to the 1400 MHz frequency band and the graph 106 corresponds to the 600 MHz frequency band.

From FIG. 4, it is known that the subarray vertical beam coverage is around 33 degrees, and the horizontal beam coverage is 120 degrees for both high, mid and low band, with respect to the example system. All the bands thus have similar coverage property. This is needed for wide band radio because the different bands of the wideband radio will have same deployment.

Figure 15:
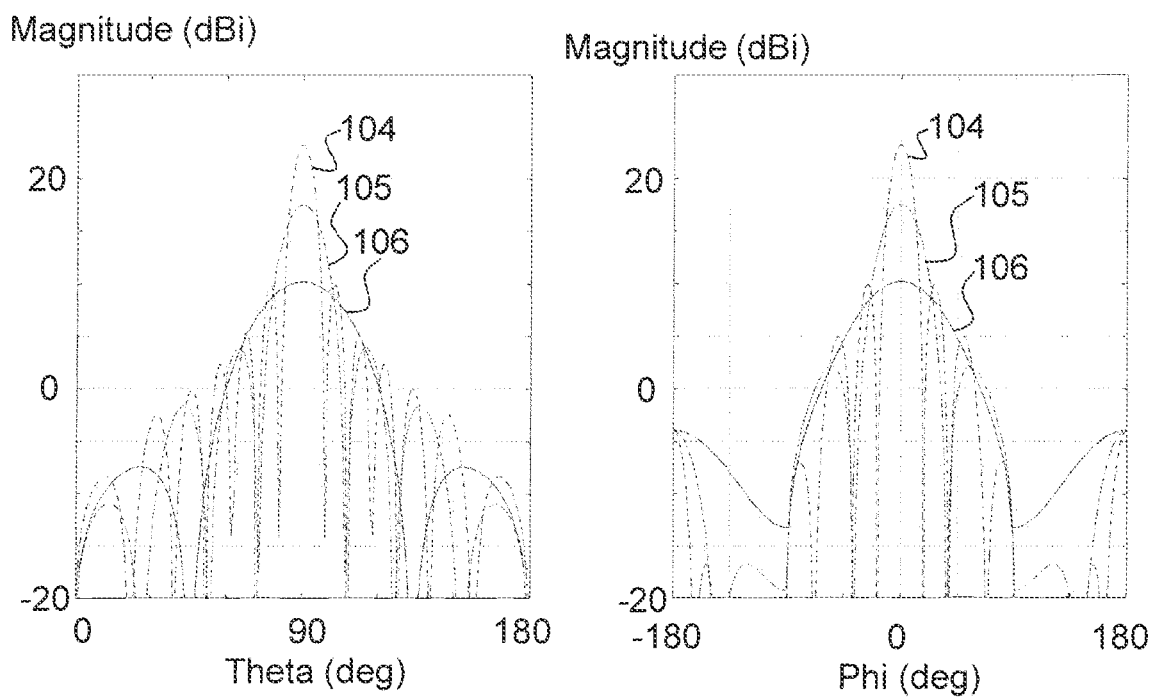
FIG. 15 are diagrams illustrating antenna array radiation patterns.

From FIG. 15, it is also known that the whole array beam characteristic is different for different bands in the example system. For 600/1400/2700 MHz frequency bands, the vertical (theta) beam width is 35/16/8 degrees. The horizontal (phi) beam width is 66/32/16 degrees. This implies that the different bands have different steerability characteristic. In the horizontal plane, for 2700 MHz, the beam width is narrow, so the beam steerability is very good. For 1400 MHz, the beam width is slightly larger, which implies that the steerability is less. For 600 MHz, the beam covers almost the entire cell, which results in that there is not really any steerability.

For the vertical direction, for 600 MHz, the subarray and antenna array are same. For 1400 MHz, the subarray is about two times the array beam width. In these cases, an electrical down-tilt may be useful for achieving a corresponding vertical coverage for mid and low band.

Figure 16:
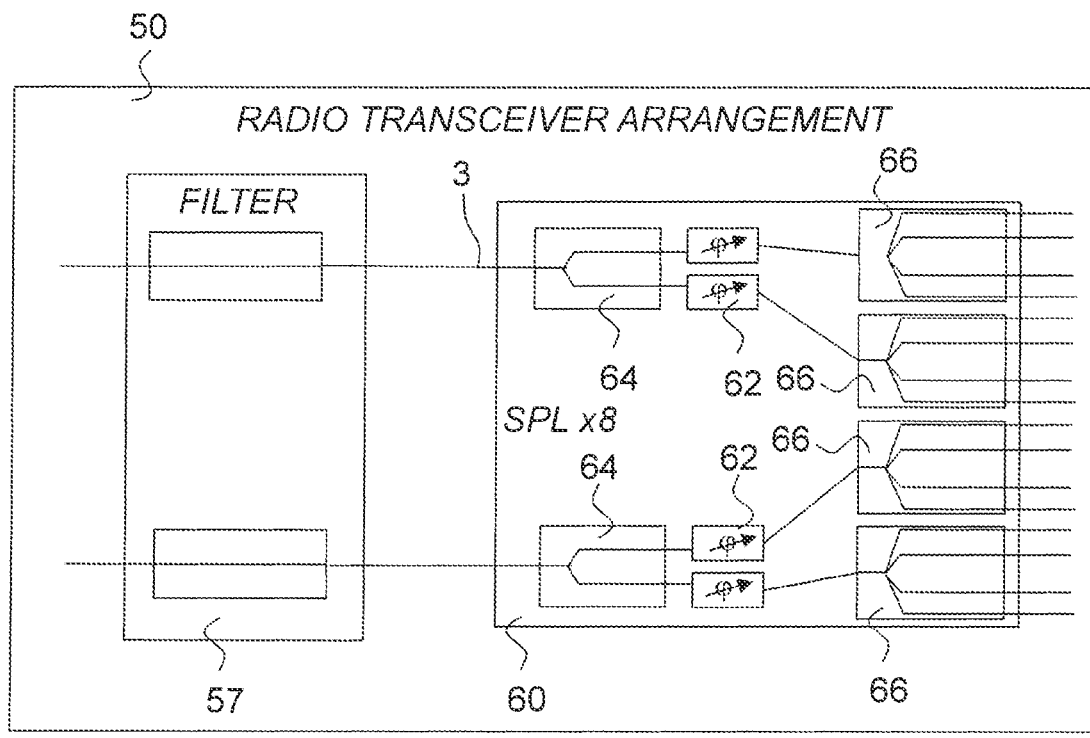
FIG. 16 is a schematic block diagram of a part of an embodiment of a radio transceiver arrangement using phase shifters.

This can be implemented by use of tuneable phase shifters. FIG. 16 illustrates a part of an embodiment of a radio transceiver arrangement 50. Only the filter box 57 and the splitting arrangement 60 are depicted in order to make the drawing more readable. In this particular embodiment, the present level is associated with two frequency bands, and the filter box consequently comprises two sets of filters, one for each frequency band. The analog signals 3 are provided to the splitting arrangement 60, which in this particular embodiment provides a splitting into eight output signals for each input signal. In this embodiment, the splitting arrangement 60 comprises a respective first splitter 64, for each input signal. The split signals are provided to a tuneable phase shifter 62, giving a predetermined phase shift to the respective signal. The relative phase shift φ between the two signals is preferably determined to give an appropriate vertical down-tilting of the final signal. Alternatively, only one of the signals is phase shifted, thus fixing the phase shift of the other signal to zero.

The phase shifted signals are provided to a second splitter 66, in this case giving four output signals for each input signal. Totally, in this embodiment, 16 output signals can be provided, 8 at a time. Of these 8 output signals, half of the signals are phase shifted by a predetermined amount relative to the other half of the signals. By providing these phase-shifted signals to the antenna array in a proper way, as such known in prior art, a tilting of the beam is achieved. Typically, a down-tilting is requested, but the arrangement may equally well be used for up-tilting as well, if this is requested to have a right vertical coverage.

The number of outputs from the splitting arrangement 60 is easily adapted to any requested even number, by adapting the splitting ratio of the second splitter 66. For instance, in order to achieve the splitter for the embodiment of FIG. 7, the second splitter is arranged to give 8 output signals for each input signal. In order to achieve the splitter for the embodiment of FIG. 8, the second splitter is arranged to give 2 output signals for each input signal. For reception of signals, the arrangement operates in an analog manner, but with received signals from the antenna array.

In other words, in one embodiment, at least one splitter arrangement of the splitter arrangements comprises phase shifters, wherein two groups of outputs from the at least one splitter arrangement are phase shifted with respect to each other.

Figure 17:
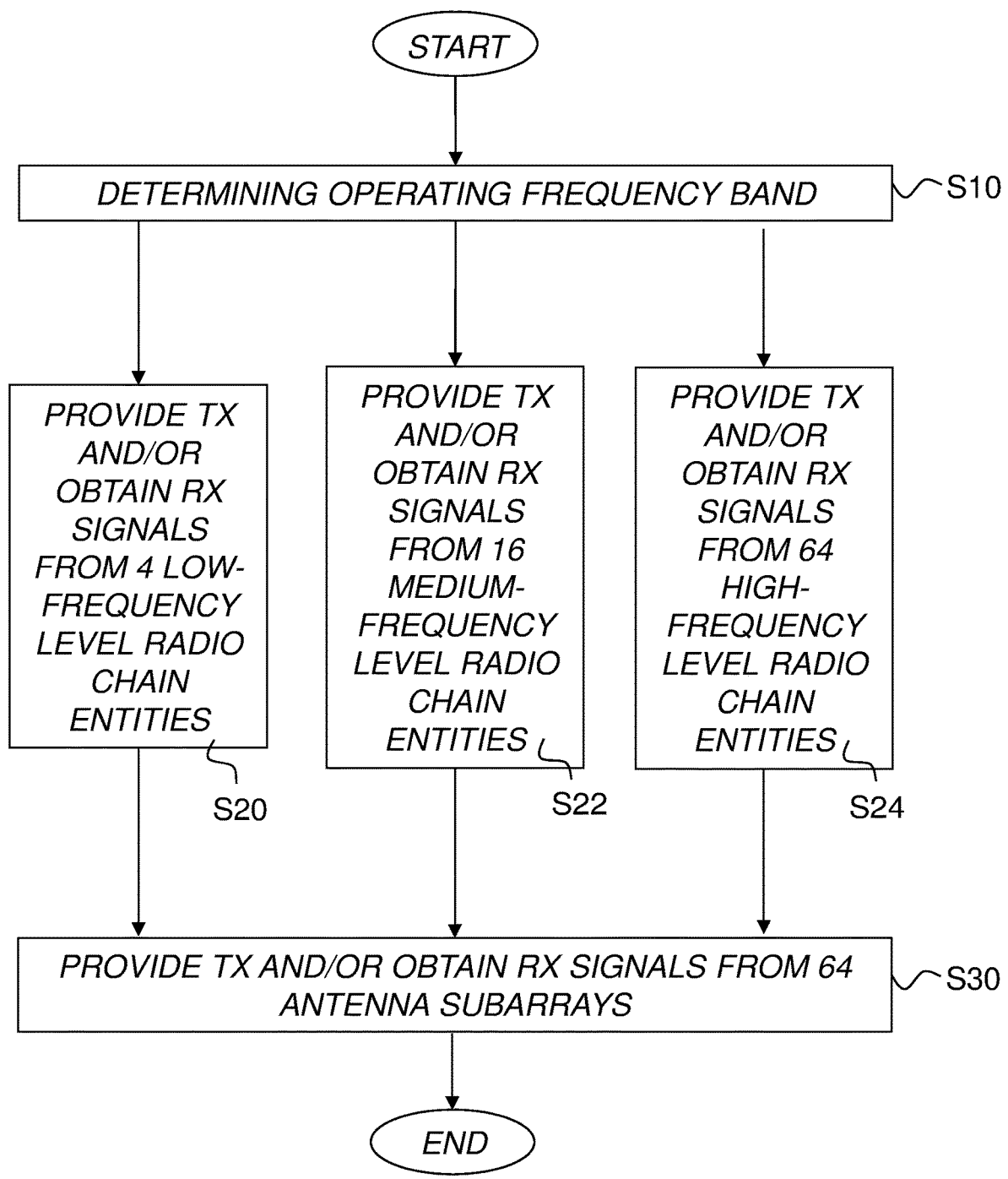
FIG. 17 is a flow diagram of steps of an embodiment of a method for operating an active antenna system.

FIG. 17 illustrates a flow diagram of steps of an embodiment of a method for operating an active antenna system. In step S10, an operating radio frequency band on which a transmission or reception is to be made is determined, out of at least two radio frequency bands. In dependence of the determined frequency band, transmission signals are provided to and/or reception signals are obtained from radio transceiver arrangements of at least two radio chain entities of one of at least two levels of radio chain entities. The radio transceiver arrangement is associated to a frequency range encompassing the operating radio frequency band. Each of the levels of radio chain entities are associated with a respective frequency range encompassing at least one radio frequency band each. At least two radio chain entities of a lower level of radio chain entities are comprised in a radio chain entity of a next higher level of radio chain entities. Each radio chain entity of the at least two levels of radio chain entities comprises a respective radio transceiver arrangement that is connected to a respective one of a number of antenna multiplexers. For all radio chain entities except a lowest level of radio chain entities, the respective radio transceiver arrangements are connected to the respective one of the number of antenna multiplexers via a splitter arrangement.

In the particular embodiment of FIG. 17, in step S20, transmission signals are provided to and/or reception signals are obtained from four low-frequency level radio chain entities. In step S22, transmission signals are provided to and/or reception signals are obtained from e.g. 16 medium-frequency level radio chain entities. In step S24, transmission signals are provided to and/or reception signals are obtained from 64 low-frequency level radio chain entities. The choice between steps S20, S22 and S24 are made based on the determination made in step S10.

In step S30, transmission signals are provided to and/or reception signals are obtained from $N_1$ antenna subarrays of an antenna array via the antenna multiplexers. The antenna array comprises $N_1$ combinations of antenna subarrays and available polarizations thereof.

In a further embodiment, the antenna array is dividable in levels of virtual antenna subarrays, which are associated with a respective one of the levels of radio chain entities. Thereby, the number of combinations of the virtual antenna subarrays of a specific level and available polarizations is equal to the number of radio chain entities of the specific level.

In a further embodiment, for each polarization, all antenna subarrays in each of the virtual antenna subarrays are connected to the frequency filter arrangement in a respective radio chain entity.

In a further embodiment, half of the signals to and/or from each of the virtual antenna subarrays are phase shifted relative to the other half of the signals to and/or from each of the virtual antenna subarrays, for at least one of the radio chain entities, if the operating radio frequency band is encompassed in the frequency range associated with the at least one of the radio chain entities, to obtain an electrical tilt.

It will be appreciated that the methods and devices described herein can be combined and re-arranged in a variety of ways.

For example, at least parts of embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

It is easily seen that by utilizing the ideas put forward here above, a number of advantages can be achieved. One advantage is that a flexible virtual subarray size can be obtained for a wideband radio system. Furthermore, the division in levels opens up for an efficient wideband AAS radio architecture. Also, requested features, such as an electrical down-tilt for wideband radio systems can be provided.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

AAS Active Antenna System
DPD Digital predistortion
FDD Frequency-division duplex
MIMO Multiple-input multiple-output
MU-MIMO Multiple user multiple-input multiple-output
NR New Radio
PA Power Amplifier
RF Radio Frequency
SU-MIMO Single user multiple-input multiple-output
TRX Transceiver

The invention claimed is:

1. A radio chain arrangement, comprising:
   at least two levels of radio chain entities;
   each of said at least two levels of radio chain entities being associated with a respective frequency range encompassing at least one radio frequency band each;
   wherein at least two radio chain entities of a lower level of radio chains are comprised in a radio chain entity of a next higher level of radio chain entities;
   each radio chain entity of said at least two levels of radio chain entities comprising a respective radio transceiver arrangement being connected to at least a respective one of a number of antenna multiplexers;
   wherein, for all radio chain entities except a lowest level of radio chains, said respective radio transceiver arrangement being connected to said respective one of said number of antenna multiplexers via a splitter arrangement.

2. The radio chain arrangement according to claim 1, wherein: $N_1$ first level radio chain entities;
   said first level radio chain entities of said at least two levels of radio chain entities being associated with a first frequency range encompassing at least one first level radio frequency band;
   each of said first level radio chain entities having a respective first level radio transceiver arrangement being connected to a respective one of $N_1$ antenna multiplexers;
   each of said first level radio chain entities is comprised in one of $N_2$ second level radio chain entities, whereby each second level radio chain entity comprises a set of at least one of said first level radio chain entities;
   said second level radio chain entities being associated with a second frequency range encompassing at least one second level radio frequency band;
   said second frequency range being situated at lower frequencies than said first frequency range;
   each of said second level radio chain entities having a respective second level radio transceiver arrangement connected via second level splitter arrangements to $N_1/N_2$ respective antenna multiplexers of said $N_1$ antenna multiplexers;
   where $N_1$ is an integer $\geq 4$, $N_2$ is an integer $\geq 2$ and $N_1/N_2$ is an integer $\geq 2$.

3. The radio chain arrangement according to claim 2, wherein:
   each of said second level radio chain entities is comprised in one of $N_3$ third level radio chain entities, whereby each third level radio chain entity comprises a set of at least one of said second level radio chain entities;
   said third level radio chain entities being associated with a third frequency range encompassing at least one third level radio frequency band;
   said third frequency range being situated at lower frequencies than said second frequency range;
   each of said third level radio chain entities having a respective third level radio transceiver arrangement connected via third frequency level splitter arrangements to $N_1/N_3$ respective antenna multiplexers of said $N_1$ antenna multiplexers;
   where $N_3$ is an integer $\geq 2$ and $N_1/N_3$ is an integer $\geq 3$.

4. The radio chain arrangement according to claim 3, wherein:
   for each integer n of $3 \leq n \leq n_x$, where $n_x$ is an integer $\geq 3$:
   each of the nth level radio chain entities is comprised in one of $N_{n+1}$ (n+1)th level radio chain entities, whereby each (n+1)th level radio chain entity comprises a set of at least one of said nth level radio chain entities;
   said (n+1)th level radio chain entities being associated with a (n+1)th frequency range encompassing at least one (n+1)th level radio frequency band;
   said (n+1)th frequency range being situated at lower frequencies than said nth frequency range;
   each of said (n+1)th level radio chain entities having a respective (n+1)th level radio transceiver arrangement connected via (n+1)th level splitter arrangements to $N_1/N_{n+1}$ respective antenna multiplexers of said $N_1$ antenna multiplexers;
   where $N_{n+1}$ is an integer $\geq 2$ and $N_1/N_{n+1}$ is an integer $\geq n+1$.

5. The radio chain arrangement according to claim 2, wherein each radio transceiver arrangement has a transmitter interface and a receiver interface connected via a filter arrangement to said $N_1$ antenna multiplexers, whereby each transmitter interface and each receiver interface is adapted to the respective frequency range and wherein each said filter arrangement is configured to operate in the respective radio frequency band.

6. The radio chain arrangement according to claim 5, wherein said transmitter interface least one of said frequency ranges encompasses at least two radio frequency bands, wherein said and said receiver interface associated with the at least one of said frequency ranges are connected via a selecting arrangement to a respective frequency filter arrangement.

7. The radio chain arrangement according to claim 2, wherein a ratio $r_L$ between the number of radio chain entities for one level and the number of radio chain entities for the next higher level is an integer equal to or larger than 2.

8. The radio chain arrangement according to claim 7, wherein each radio chain entity of a level, except for the lowest level, comprises at least $r_L-1$ radio chain entities of a next lower level.

9. The radio chain arrangement according to claim 7, wherein a radio chain entity of at least one level of radio chain entities, except for the lowest level, comprises $r_L-1$ radio chain entities of a next lower level, wherein said radio transceiver arrangement of said radio chain entity of said at least one level of radio chain entities has a transmitter interface and a receiver interface operating also at frequencies of said frequency range of said next lower level and being connected via a selecting arrangement of said radio transceiver arrangement of said radio chain entity of said at least one level of radio chain entities to a filter arrangement configured to operate in a radio frequency band encompassed by said frequency range of said next lower level.

10. The radio chain arrangement according to claim 8, wherein each radio chain entity of the said at least two levels of radio chain entities of a level, except for the lowest level, comprises $r_L$ radio chain entities of a next lower level.

11. The radio chain arrangement according to claim 2, wherein at least one splitter arrangement of said splitter arrangements comprises phase shifters, wherein two groups of outputs from said at least one splitter arrangement are phase shifted with respect to each other.

12. The radio chain arrangement according to claim 3, wherein $N_1=64$, $N_2=16$ and $N_3=4$, wherein said first level is a high-frequency level, said second level is a medium-frequency level and said third level is a low-frequency level.

13. The radio chain arrangement according to claim 12, wherein said frequency range associated with said high-frequency level encompasses one frequency band, said frequency range associated with said medium-frequency level encompasses two frequency bands and said frequency range associated with said low-frequency level encompasses two frequency bands.

14. The radio chain arrangement according to claim 13, wherein a first low-frequency filter arrangement of low-frequency filter arrangements operates with an uplink radio frequency band between 663 and 698 MHz and a downlink radio frequency band between 617 and 652 MHz, a second low-frequency filter arrangement of said low-frequency filter arrangements operates with an uplink radio frequency band between 703 and 748 MHz and a downlink radio frequency band between 758 and 803 MHz, a first medium-frequency filter arrangement of medium-frequency filter arrangements operates with an uplink radio frequency band between 1427 and 1470 MHz and a downlink radio frequency band between 1475 and 1518 MHz, a second medium-frequency filter arrangement of said medium-frequency filter arrangements operates with an uplink radio frequency band between 1710 and 1785 MHz and a downlink radio frequency band between 1805 and 1880 MHz, and said high-frequency filter arrangement operates with an uplink radio frequency band between 2500 and 2570 MHz and a downlink radio frequency band between 2620 and 2690 MHz.

15. An active antenna system comprising:
the radio chain arrangement according to claim 1;
an antenna array of a plurality of antenna subarrays;
wherein a number of combinations of said plurality of antenna subarrays and available polarizations thereof corresponds to said number of antenna multiplexers;
wherein each of said combinations of said plurality of antenna subarrays and available polarizations thereof is connected to a respective output from said antenna multiplexers.

16. The active antenna system according to claim 15, wherein: $N_1$ first level radio chain entities;
said first level radio chain entities of said at least two levels of radio chain entities being associated with a first frequency range encompassing at least one first level radio frequency band;
each of said first level radio chain entities having a respective first level radio transceiver arrangement being connected to a respective one of $N_1$ antenna multiplexers;
each of said first level radio chain entities is comprised in one of $N_2$ second level radio chain entities, whereby each second level radio chain entity comprises a set of at least one of said first level radio chain entities;
said second level radio chain entities being associated with a second frequency range encompassing at least one second level radio frequency band;
said second frequency range being situated at lower frequencies than said first frequency range;
each of said second level radio chain entities having a respective second level radio transceiver arrangement connected via second level splitter arrangements to $N_1/N_2$ respective antenna multiplexers of said $N_1$ antenna multiplexers;
where $N_1$ is an integer $\geq 4$, $N_2$ is an integer $\geq 2$ and $N_1/N_2$ is an integer $\geq 2$; and
wherein said number of combinations of said plurality of antenna subarrays and available polarizations thereof is equal to $N_1$.

17. The active antenna system according to claim 16, wherein said antenna subarrays have two polarizations each; wherein said antenna array has $N_1/2$ antenna subarrays.

18. The active antenna system according to claim 16, wherein said antenna array is dividable in levels of virtual antenna subarrays, being associated with a respective one of said levels of radio chain entities, whereby a number of combinations of said virtual antenna subarrays of a specific level and available polarizations is equal to a number of radio chain entities of said specific level.

19. The active antenna system according to claim 18, wherein, for each polarization, all antenna subarrays in each of said virtual antenna subarrays are connected to a frequency filter arrangement in a respective radio chain entity of said at least two levels of radio chain entities.

20. A method for operating an active antenna system, comprising:
determining an operating radio frequency band, out of at least two radio frequency bands, on which a transmission or reception is to be made;
providing transmission signals to and/or obtaining reception signals from radio transceiver arrangements of at least two radio chain entities of one of at least two levels of radio chain entities, associated to a frequency range encompassing said operating radio frequency band;
each of said levels of radio chain entities being associated with a respective frequency range encompassing at least one radio frequency band each;
wherein at least two radio chain entities of a lower level of radio chain entities are comprised in a radio chain entity of a next higher level of radio chain entities;
each radio chain entity of said at least two levels of radio chain entities comprising a respective radio transceiver arrangement being connected to a respective one of a number of antenna multiplexers;

wherein, for all radio chain entities except a lowest level of radio chain entities, said respective radio transceiver arrangement being connected to said respective one of said number of antenna multiplexers via a splitter arrangement; and providing transmission signals to and/or obtaining reception signals from $N_1$ antenna subarrays of an antenna array via said antenna multiplexers;

wherein said antenna array comprises $N_1$ combinations of antenna subarrays and available polarizations thereof.

\* \* \* \* \*